May 28, 1968 O. TARABORRELLI 3,385,497

DRIVE MEANS, PARTICULARLY FOR TAPE PLAYERS

Filed March 16, 1966 2 Sheets-Sheet 1

INVENTOR.
ORLANDO TARABORRELLI
BY
Frank D Prager
ATTORNEY

DRIVE MEANS, PARTICULARLY FOR TAPE PLAYERS

Filed March 16, 1966 2 Sheets-Sheet 2

INVENTOR.
ORLANDO TARABORRELLI
BY
Frank D Prager
ATTORNEY 3,385,497

DRIVE MEANS, PARTICULARLY FOR TAPE PLAYERS

Orlando Taraborrelli, Bryn Mawr, Pa., assignor to Philco-Ford Corporation, a corporation of Delaware Filed Mar. 16, 1966, Ser. No. 534,722
5 Claims. (Cl. 226—178)

ABSTRACT OF THE DISCLOSURE

Dual-speed drive for a flywheel-stabilized single-reel cartridge tape player. In the new apparatus, a single motor provides the dual-speed drive, including the required relatively low playing speed, stabilized by flywheel action, and a fast rewind speed. Two belt transmissions are provided, actuated by separate pulleys on the single motor output shaft. One transmission belt engages the flywheel, while the other belt directly engages the tape-engaging capstan. Alternate clutching and belt-controlling means renders either the flywheel or the second transmission belt effective to drive the capstan.

Figures 1, 2:
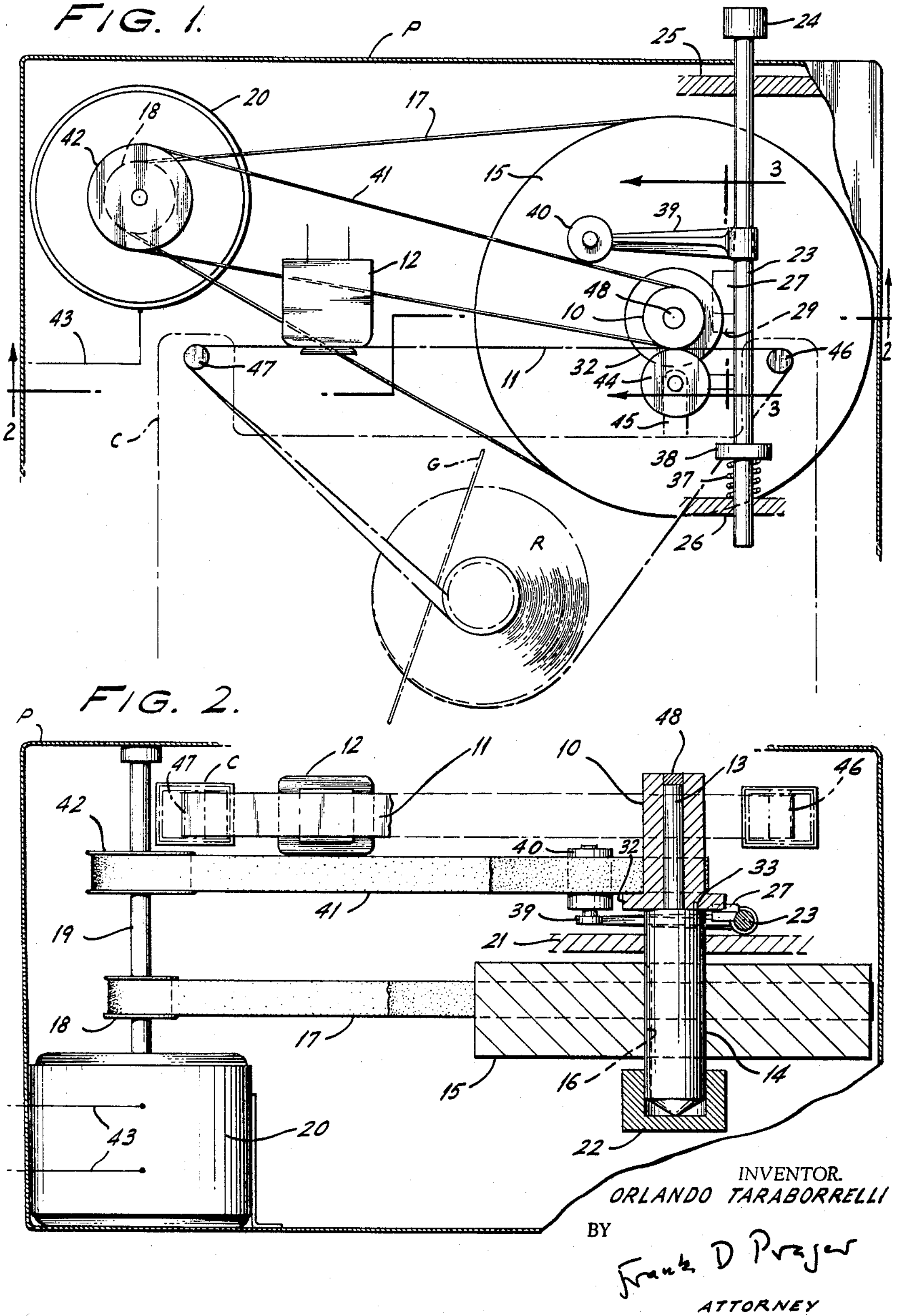

This invention relates to drive means, particularly for cartridge tape players. Such a player uses a tape, with a program recorded thereon, and operates monodirectionally to remove the tape from a coiled loop, and to return it to the same pursuant to driving the tape past a record-reading device. A so-called capstan is provided in the player to effect the driving of the tape. It turns in a single direction but at different speed, depending on whether the program is played back or whether a fast winding or so-called rewinding operation is performed.

During the playback, a variety of forces tend to make the speed of the capstan-driven tape non-uniform and thereby to cause distortion in the playback of the program. In opposition to such forces it is usual to connect the driving capstan to a flywheel, particularly in tape units of the indicated type.

This use of a flywheel gives rise to a problem on those frequent occasions when the user wishes to change the speed of the tape, for instance in order to select a new portion of the program for playing. The so-called rewinding of the tape, which is needed at such times, requires a change of tape speed up to several times the normal playback speed. Subsequently this normal speed must be resumed and even minor changes thereof must again be prevented.

Constructions are known which in some ways provide for the indicated changes of speed of a capstan system, but generally they obtain these changes only with objectionable loss of time, or of maintained accuracy of playing speed, or by complex or expensive mechanism. It is a principal object of this invention to improve a capstan system, and particularly a cartridge tape capstan system, in these respects. It is a specific object to make the change of speed very prompt and nevertheless to keep the playback speed of the cartridge tape accurately uniform throughout an ensuing playback period. It is a further object to provide for the different speeds, and related features, by simple and inexpensive mechanism which can be incorporated in a cartridge player with success.

For these purposes the invention provides a novel system of capstan, flywheel, and multiple drive means, with interlocked means for mutual interconnection of the various drive means with the capstan and flywheel, and for mutual connection and disconnection of the capstan and flywheel, to drive a cartridge tape or the like properly while playing it, and to move it at a different speed for rewinding. This system will now be explained more fully, in connection with several embodiments of the invention which are shown in the drawing appended hereto.

Figures 3, 4:
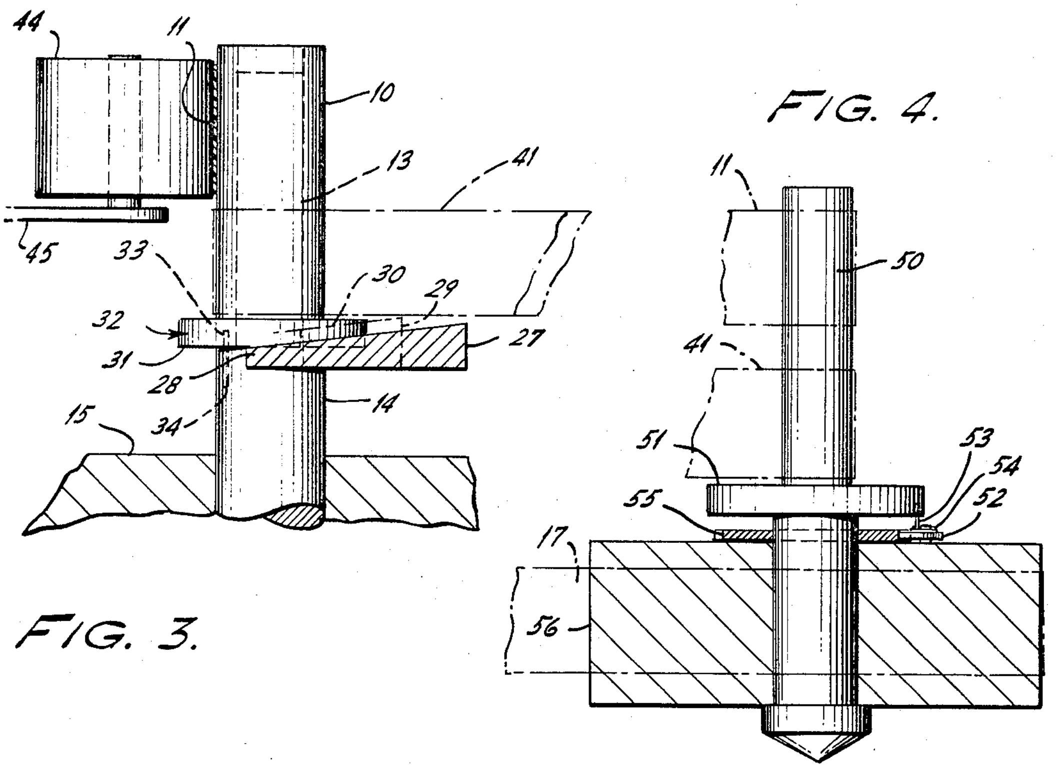

FIGURE 1 is a fragmentary showing of one embodiment, in plan view, also schematically showing the position of the cartridge and tape. FIGURE 2 is a sectional view taken generally along lines 2—2 in FIGURE 1. FIGURE 3 is another view, partly in section, which is taken generally along line 3—3 in FIGURE 1.

Figure 5:
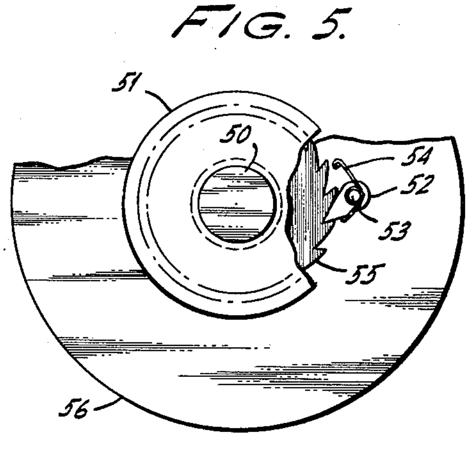
Figure 6:
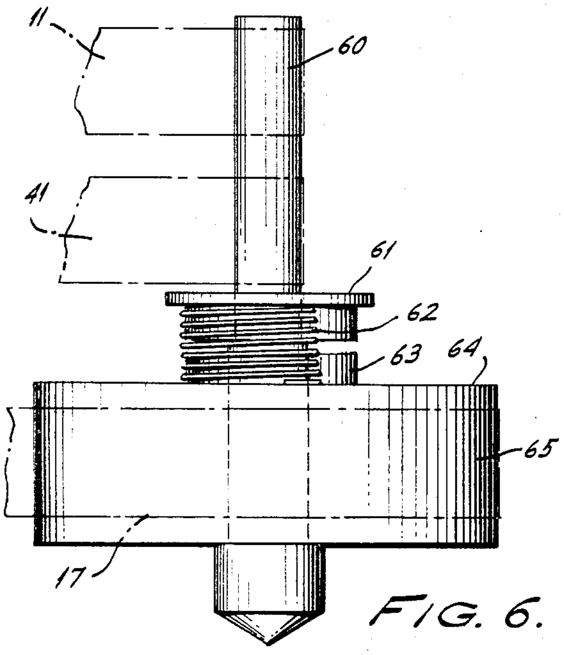

FIGURE 4 represents a modified detail, in orientation similar to that of FIGURE 3. FIGURE 5 is a partial plan view of the apparatus shown in FIGURE 4. FIGURE 6 is a view generally similar to FIGURE 4 but showing another modification of the capstan and flywheel combination.

As shown in FIGURES 1 and 2 capstan 10 drives magnetic tape 11, the bulk of which is stored as a reel R in cartridge C but a short portion of which is removed from the center of reel R, over guide G, to pass through or over a suitable recording and reproducing head 12 in player and capstan mechanism P and then to be returned to the outside of reel R. Capstan 10 is pivoted to upper end 13 of drive shaft 14, while a lower portion of this shaft has flywheel 15 permanently secured thereto, for instance by key and groove means 16. Flywheel 15 is peripherally driven, through belt 17, by drive pulley 18 which is suitably secured to shaft 19 of drive motor 20. The flywheel in turn can be coupled to drive capstan 10, as will now be described.

During normal playing operation the flywheel serves to minimize fluctuations and changes of rotary speed of the capstan, which otherwise would occur because of uncontrollable or imperfectly controllable effects including for instance fluctuations of power output in motor 20, or of tape friction in reel R. Changes of this kind are minimized by the inertia of flywheel 15, normally coupled to the capstan. In this way the apparatus provides substantially uniform tangential velocity of the capstan, substantially uniform linear velocity of the tape, and consequent satisfactory performance of the tape reading and sound reproducing process in pickup head 12.

At certain times, however, the speed of tape 11 must be increased considerably, in order that a desired portion of the program recorded on this tape may be selected for prompt reproduction. At such times the former speed of the tape, and its constant maintenance, is no longer desired. The flywheel is then decoupled from the capstan, and steps are taken promptly to obtain considerable increase in capstan speed. For this purpose the invention provides a decoupling rod 23, operable by a handle or push button 24 at one end of this rod. The rod is slidable in bearings 25 and 26 and carries a capstan engaging member 27, the action of which can best be described in conjunction with FIGURES 2 and 3.

As shown in these figures, capstan engaging member 27 is a wedge having a front edge or narrow end 28 and horizontally movable between the position shown in full lines and a second position shown in broken lines at 29. When the wedge is in the latter position an upper surface 30 of the wedge contacts the underside 31 of a flange 32 on capstan 10, thereby slightly lifting the capstan and disengaging it from the top end 33 of a pin 34. This pin is driven into a shoulder on flywheel shaft 14, near the foot of upward shaft extension and capstan journal 13. When wedge member 27 is withdrawn to the full line position, capstan 10 is free to drop onto said shoulder, and pursuant to a small extent of rotation of the capstan, relative to the flywheel shaft, pin element 33 enters a recess in capstan shoulder 32 and thereby again couples the capstan to the flywheel. The rearward position of wedge 27, shown in FIGURE 1 in full lines, is the normal one for this wedge and its supporting rod 23, a spring 37 being interposed between bearing 26 and collar 38 on rod 23 to push this rod rearwardly and thereby to move the wedge to said rearward position. Thus capstan 10 is normally engaged by flywheel 15 but the user can disengage the one from the other by depressing push button 24 and holding it down.

This operation also engages capstan 10 with a rapid drive system independent of flywheel 15. For this purpose the aforementioned rod 23 carries an arm 39, the free end of which has an idler roll 40 thereon, as shown in FIGURES 1 and 2. When push button 24 and rod 23 are pushed against the action of the aforementioned spring 37, arm 39 presses roll 40 against belt 41. The belt is tensioned by such engagement, and then effectively interconnects capstan 10 with drive pulley 42 on motor shaft 19, whereas the belt merely idles over the capstan when not so tensioned. While the other belt 17, driven by motor pulley 18, provides considerable speed reduction between motor shaft 19 and capstan shaft 14, the dimensions of capstan and pulleys are such that the present belt 41 provides an increase of speed from the motor shaft to the capstan, thereby leading to very rapid rotation of the capstan. The direction of rotation of the capstan is the same whether it be driven slowly by belt 17 and flywheel 15, or rapidly by belt 41 independent of the flywheel.

In normal playback operation motor 20 is energized by electric power, which is supplied by a circuit partly shown at 43. The motor drives pulley 18, belt 17, and flywheel 15. With push button 24 released and pin 33 engaged, capstan 10 then rotates with the flywheel. Magnetic tape 11 is in surface engagement with the capstan and is pressed against the same by an idling pressure roller 44, suitably mounted on arm 45. As a result, the capstan then drives the tape over guides 46, 47 in cartridge C, and past pickup head 12 in player unit P, thereby providing for the desired playback.

Whenever the user wishes to interrupt this playback and to rewind the tape, he depresses push button 24. This disengages the capstan from the flywheel by means of wedge 27. This operation also engages capstan 10 with rapid belt drive 41 by pressure roller 40. As a result the speed of the tape is greatly increased, while the direction of tape motion remains the same. The consequent rapid winding or so-called rewinding of the tape is applied until a desired tape position or program point is found, by sensing means not shown herein, at which time the operation initiated by depression of push button 24 is manually or automatically terminated, and capstan 10 is reengaged to flywheel 15 and disengaged from rapid belt drive 41, thereby causing prompt resumption of the playback tape motion at exactly proper speed, which the flywheel has maintained in the meantime.

It will be seen that the mechanism described up to this point acts as a one-tooth clutch, connecting and disconnecting the capstan and flywheel by small vertical motions of the capstan, along the flywheel shaft, the upward motion being enforced by the action of wedge 27 and the downward motion being caused by gravity. In addition this downward motion can be prompted by a small permanent magnet 48, mounted in the top of capstan 10 and disposed in magnetic circuit with capstan shaft and journal element 13.

Referring now to the modified embodiment of FIGURES 4 and 5: in this case a unitary capstan shaft and capstan 50 is movably journalled to a flywheel. The wheel is releasably connected to the capstan by mechanism which comprises a pawl carrier plate 51, fast on the capstan and shaft, and a pawl 52 disposed on the underside of this plate and pivoted thereto by pin 53. A spring 54 is provided to normally engage the pawl with a ratchet 55 which is secured to the top surface of flywheel 56. Normally, flywheel 56 is driven by belt 17 and drives capstan 50 by ratchet 55 and pawl 52, for the playback of tape 11. At such time belt 51 is in sliding contact with capstan 50. For fast rewinding, the tension of belt 51 is increased, or that of belt 17 decreased, by mechanism which may be similar to roller 40 in FIGURE 1. As a result the capstan then rotates at an angular speed more rapid than the flywheel. For a few moments pawl 52 then slides over ratchet 55, with a clicking motion; thereafter the centrifugal force acting on the pawl, due to the rapid motion of capstan 50 and pawl carrier 51, holds the pawl disengaged from ratchet 55.

Still another modification, and in some respects a simplification of the mechanism, is illustrated in FIGURE 6. Capstan shaft unit 60 has a shouldered plate 61 secured thereto, this plate being arranged to be releasably connected, by a plain coil spring 62, with a correspondingly shaped extension 63 on top surface 64 of flywheel 65. Initially belt 17 drives this flywheel at a speed greater than the (zero) speed of capstan 60; the peripheral surface of extension 63 then engages or clutches the lower end of coil spring 62, the upper end of which then similarly engages the peripheral surface of plate 61. Part of the spring is broken off in the drawing to show the structure surrounded by the spring.

As a result of the clutching action the flywheel drives the capstan, at uniform rotary speed, to drive magnetic tape 11. At this time rapid belt drive 41 idles. However, when the latter belt drive is tensioned, for instance by a device similar to roller 40 in FIGURE 1, capstan 60 and plate 61 rotate more rapidly than the flywheel, and disengage the upper end of spring 62, and the lower end of this spring then disengages flywheel extension 63. A simple helically wound spring 62 can be used to provide this clutch system. Neither end of the spring is in need of any special extension or attachment thereof to anchor it in the flywheel or shouldered plate.

While only a few embodiments of the invention have been described, the details thereof are not to be construed as limitative of the invention. The invention contemplates such variations and modifications as come within the scope of the appended claims.

I claim:

1. In apparatus for propelling a tape or the like at various linear velocities, including a uniformly maintained relatively slow linear velocity and a higher linear velocity:

(1) a capstan to effect such propelling of the tape;

(2) a flywheel releasably engageable with the capstan for stabilizing the tape during operation at said relatively slow linear velocity;

(3) a motor; a shaft driven thereby; a relatively small pulley on said shaft; belt type power transmission means connecting said pulley with said flywheel to drive the flywheel and thereby the capstan at a tangential velocity such as to propel the tape at said uniformly maintained relatively slow linear velocity;

(4) a second, relatively large pulley on said shaft, and second belt type power transmission means, engaging said second pulley for rotating the capstan at a tangential velocity such as to propel the tape at said higher linear velocity; and (5) means for alternately (a) connecting the capstan to the second pulley through the second power transmission means while mutually disengaging the flywheel and the capstan, and (b) connecting the capstan to the first pulley through the first power transmission means while automatically mutually interengaging the flywheel and capstan.

2. Apparatus for driving and rewinding the program reproducing tape of a cartridge type tape player, said apparatus comprising:

(a) a capstan; a flywheel for uniformly maintaining a certain rotary speed of the capstan; a shaft secured to the flywheel, journalled to the capstan, and coaxial to both;

(b) detent means on said shaft, engageable with associated detent means on said capstan;

(c) first actuating means, for rotating the flywheel to rotate the capstan in a certain rotary direction, during said driving; second actuating means, for rotating the capstan more rapidly in the same rotary direction, during said rewinding; and (d) means, including said detent means, for selectively shifting the capstan to different positions relative to and along said shaft, and for alternately, incident to such shifting, (1) mutually interengaging the flywheel and the capstan, while automatically releasing the capstan from the second actuating means, for said driving, and (2) connecting the capstan to the second actuating means while automatically mutually disengaging the flywheel and the capstan, for said rewinding.

3. Apparatus as described in claim 2 wherein the means for tightening or relaxing said belt includes a structure shiftable relative to the capstan, said structure also carrying said means for mutually disengaging and interengaging the flywheel and capstan.

4. Apparatus for driving and rewinding the program reproducing tape of a cartridge type tape player, said apparatus comprising:

a capstan for such driving and rewinding; a flywheel for uniformly maintaining the speed of such driving; a first belt, engaging the flywheel to rotate the capstan in a certain direction during the driving of the tape; a second belt, for directly rotating the capstan, more rapidly, in the same direction, during the rewinding; and means for alternately tightening and relaxing one of said belts and for, coincident thereto, alternately (a) mutually interengaging the flywheel and the capstan, for said driving, and (b) mutually disengaging the flywheel and the capstan, for said rewinding.

5. Apparatus as described in claim 4 wherein the means for automatically mutually disengaging and interengaging the flywheel and capstan includes cooperative pawl and ratchet structures, coaxially disposed on the capstan and flywheel.

References Cited

UNITED STATES PATENTS 3,124,291 3/1964 Beer ---------------- 226—178

ALLEN N. KNOWLES, *Primary Examiner.*